US011320702B2

(12) United States Patent
Huang et al.

(10) Patent No.: US 11,320,702 B2
(45) Date of Patent: May 3, 2022

(54) DISPLAY SUBSTRATE AND DISPLAY PANEL

(71) Applicant: WUHAN CHINA STAR OPTOELECTRONICS TECHNOLOGY CO., LTD., Hubei (CN)

(72) Inventors: Jianlong Huang, Hubei (CN); Zhandong Zhang, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/042,133

(22) PCT Filed: Aug. 20, 2020

(86) PCT No.: PCT/CN2020/110316
§ 371 (c)(1),
(2) Date: Sep. 27, 2020

(65) Prior Publication Data
US 2022/0043291 A1 Feb. 10, 2022

(51) Int. Cl.
G02F 1/1339 (2006.01)
G02F 1/1335 (2006.01)
G02F 1/1333 (2006.01)

(52) U.S. Cl.
CPC .... G02F 1/13396 (2021.01); G02F 1/133345 (2013.01); G02F 1/133351 (2013.01); G02F 1/133357 (2021.01); G02F 1/133512 (2013.01); G02F 1/133514 (2013.01)

(58) Field of Classification Search
CPC ......... G02F 1/133351; G02F 1/133512; G02F 1/133345; G02F 1/133357; G02F 1/133514
See application file for complete search history.

(56) References Cited

U.S. PATENT DOCUMENTS

2007/0242193 A1* 10/2007 Shin .................. G02F 1/133512
349/106

FOREIGN PATENT DOCUMENTS

CN 105527746 A * 4/2016

* cited by examiner

Primary Examiner — Jessica M Merlin
(74) Attorney, Agent, or Firm — Mark M. Friedman

(57) ABSTRACT

An embodiment of the present invention discloses a display substrate and a display panel. The display substrate includes a plurality of first display portions each of which is disposed in a gap between adjacent two of first limiting portions; a plurality of second display portions each of which is disposed in a gap between adjacent two of second limiting portions. The gap between the adjacent two first limiting portions is greater than the gap between the adjacent two second limiting portions. A difference between a height of a top of each of the second display portions and a height of a top of each of the first display portions is less than a predetermined difference.

14 Claims, 4 Drawing Sheets

DISPLAY SUBSTRATE AND DISPLAY PANEL

FIELD OF INVENTION

The present invention relates to a field of display technologies, specifically relates to a display substrate and a display panel.

BACKGROUND OF INVENTION

In industries of display panels, usually sub-display panels of various sizes are manufactured in a large panel. difference between areas of pixels of sub-display panels of different sizes is excessively large.

SUMMARY OF INVENTION

Technical Issue

However, a display layer of each display panel is manufactured by the same process. Because a display layer with a greater pixel area requires more material of the display layer and a display layer with a smaller pixel area requires less material of the display layer, the display layer of the display panel with the smaller pixel area has a greater thickness such that difference between heights of display substrates for sub-display panels of different sizes is excessively large to lower flatness of the display substrate.

Technical Solution

The embodiment of the present invention provides a display substrate and a display panel reducing a difference between heights of display layers of sub-display panels of different sizes to improve flatness of the display substrate.

The embodiment of the present invention provides a display substrate, comprising:

an underlay substrate;

a limiting layer disposed on the underlay substrate, wherein the limiting layer comprises a plurality of first limiting portions disposed at intervals and a plurality of second limiting portions disposed at intervals;

a plurality of first display portions, wherein each of the first display portions is disposed in a gap between adjacent two of the first limiting portions and on the adjacent two first limiting portions; and a plurality of second display portions, wherein each of the second display portions is disposed in a gap between adjacent two of the second limiting portions and on the adjacent two second limiting portions, wherein the gap of the adjacent two first limiting portions is greater than the gap of the adjacent two second limiting portions;

wherein a difference between a height of a top of the second display portions and a height of a top of the first display portions is less than a predetermined difference.

The embodiment of the present invention also provides a display panel, comprising a first sub-display panel and a second sub-display panel, wherein an area of each of sub-pixels in the first sub-display panel is greater than an area of each of sub-pixels in the second sub-display panel, the sub-pixels of the first sub-display panel correspond to the first display portions in position, the sub-pixels in the second sub-display panel correspond to the second display portions in position, each of the first sub-display panel and the second sub-display panel comprises the above display substrate.

Advantages

The display substrate and the display panel of the embodiment of the present invention, comprises an underlay substrate; a limiting layer disposed on the underlay substrate, wherein the limiting layer comprises a plurality of first limiting portions disposed at intervals and a plurality of second limiting portions disposed at intervals; a plurality of first display portions, wherein each of the first display portions is disposed in a gap between adjacent two of the first limiting portions and on the adjacent two first limiting portions; and a plurality of second display portions, wherein each of the second display portions is disposed in a gap between adjacent two of the second limiting portions and on the adjacent two second limiting portions, wherein the gap of the adjacent two first limiting portions is greater than the gap of the adjacent two second limiting portions; wherein a difference between a height of a top of the second display portions and a height of a top of the first display portions is less than a predetermined difference. Because the difference between the height of the top of each of the second display portions and the height of the top of each of the first display portions is less than the predetermined difference, flatness of the display substrate and display effect are improved.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
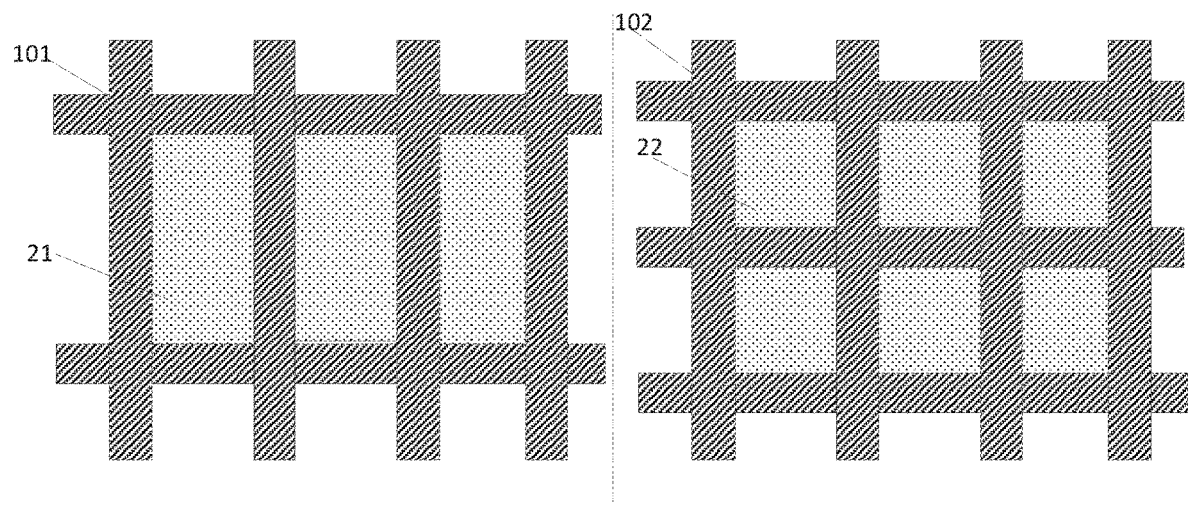
FIG. 1 is a top view of a conventional display panel.

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

In the description of the present invention, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present invention and simplifying the description instead of indicating or implying that the referred device or element must have a specific orientation or position, must to be structured and operated with the specific orientation or position. Therefore, they should not be understood as limitations to the present invention. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present invention, a meaning of "a plurality of" is two or more, unless there is a clear and specific limitation otherwise.

In the description of the present invention, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present invention can be understood on a case-by-case basis.

In the present invention, it should be noted that unless clear rules and limitations otherwise exist, words "a first feature is "on" or "under" a second feature" can include a direct contact of the first and second features, can also include a contact of the first and second features through another feature there between instead of a direct contact. Furthermore, words "the first feature is "above" or "over" the second feature include that the first feature is right above or obliquely above the second feature, or only indicate that a level of the first feature is higher that of the second feature. Words "the first feature is "under" or "below" the second feature include that the first feature is right under or obliquely under the second feature, or only indicate that the level of the first feature is lower than that of the second feature.

The following disclosure provides many different embodiments or examples to achieve different structures of the present invention. To simplify the disclosure of the present invention, the components and arrangements of the specific examples are described below. Of course, they are merely examples, and the purpose is not to limit the present invention. Furthermore, the present invention may repeat reference numerals and/or reference letters in different examples. The repetition is for the purpose of simplification and clarity, and does not by itself indicate the relationship between the various embodiments and/or settings discussed. In addition, the present invention provides examples of various specific processes and materials, but a person of ordinary skill in the art can be aware of the application of other processes and/or the use of other materials.

With reference to FIG. 1, in a top view, a conventional display panel comprises a first sub-display panel 101 and a second sub-display panel 102. The first sub-display panel 101 comprises first sub-pixels 21, and the second sub-display panel comprises second sub-pixels 22. An area of each of the first sub-pixels 21 is greater than an area of each of the second sub-pixels 22.

Figure 2:
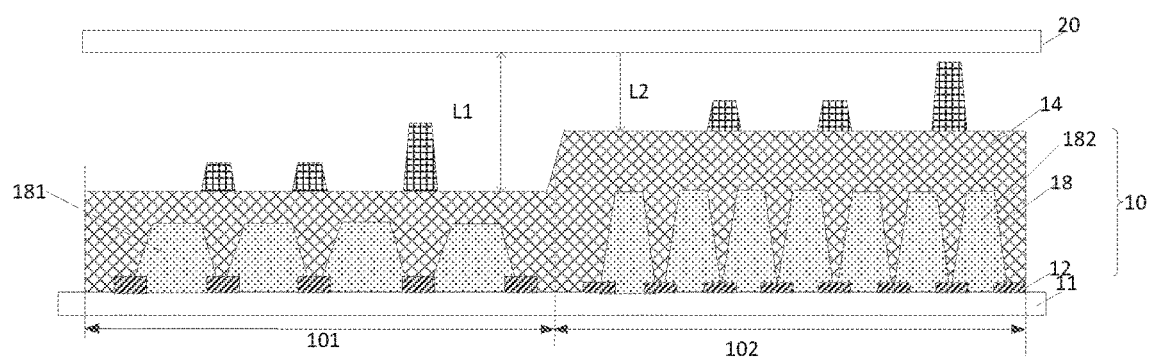
FIG. 2 is a schematic cross-sectional view of the conventional display panel.

With reference to FIG. 2, a cross-sectional structure of the display panel comprises a first substrate 10 and a second substrate 20. The first substrate 10 comprises an underlay substrate 11, a black matrix 12, a color filter layer 18, and a planarization layer 14. The color filter layer 18 comprises a plurality of first color resists 181 and a plurality of second color resists 182. An area of an orthographic projection of the second color resists 182 on the underlay substrate is less than an area of an orthographic projection of the first color resists 181 on the underlay substrate such that during coating the color filter layer, because each color resist is ejected in the same amount, when a difference between sizes of the sub-pixels is greater, the first sub-pixels 21 with greater areas require more amount of the color resist to fill the gaps among the black matrix, and the second sub-pixel 22 with the less areas require less amount of the color resist to fill the gaps among the black matrix. Therefore, it results in excessive amount of the color resist to further increase a height of the second color resist 182, and ultimately results in an excessive difference between heights of the first substrate 10 corresponding to the first sub-display panel 101 and the first substrate 10 corresponding to the second sub-display panel 102. A gap between the first substrate 10 and the second substrate 20 of the first sub-display panel 101 is L1, a gap between the first substrate 10 and the second substrate 20 of the second sub-display panel 102 is L2, and L1 is greater than L2, which lowers the display effect.

Figure 3:
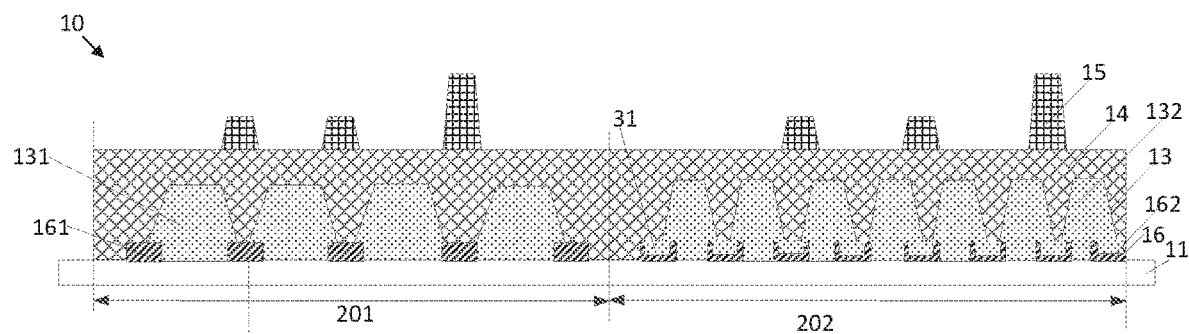
FIG. 3 is a schematic cross-sectional view of a display substrate provided by an embodiment of the present invention.

With reference to FIG. 3, FIG. 3 is a schematic cross-sectional view of a display substrate provided by an embodiment of the present invention.

With reference to FIG. 3, the display substrate 10 of the present embodiment comprises: an underlay substrate 11, a limiting layer 16, a plurality of first display portions 131, and a plurality of second display portions 132.

The underlay substrate 11 can be a glass substrate or a flexible underlay substrate. Material of the underlay substrate 11 comprises at least one of glass, silicon dioxide, polyethylene, polypropylene, polystyrene, polylactide, polyethylene terephthalate, polyimide, or polyurethane.

Figure 4:
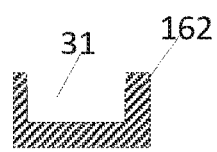
FIG. 4 is a schematic structural view of a second limiting portions in FIG. 3.

The limiting layer 16 is disposed on the underlay substrate 11. The limiting layer 16 comprises a plurality of first limiting portions 161 disposed at intervals and a plurality of second limiting portions 162 disposed at intervals. With further reference to FIG. 4, first recesses 31 are defined in the second limiting portions 162 respectively. In an embodiment, for further improvement of flatness of the display substrate and enhancement of light-shielding effect, a depth of the first recesses 31 ranges from 0.05 um to 1 um. Of course, it can be understood that a specific depth of each of the first recesses is not limited but can be set according to demands. In a preferred embodiment, to further improve the display effect, material of the limiting layer 16 can be light-shielding resin material, namely, material of the limiting layer 16 is the same as material of the black matrix.

Each of the first display portions 131 is disposed in a gap between adjacent two of the first limiting portions 161 and is disposed on the first limiting portions 161.

Each of the second display portions 132 is disposed in a gap between adjacent two of the second limiting portions 162, is disposed on the second limiting portions 162, and is disposed in the first recesses 31. Namely, a portion of each of the second display portions 132 is located in one of the first recesses 31. The gap between the adjacent two first limiting portions 161 is greater than the gap between the adjacent two second limiting portions 162 such that an area of an orthographic projection of the second display portions 132 on the underlay substrate 11 is less than an area of an orthographic projection of the first display portions 131 on the underlay substrate 11. The first display portions 131 and the second display portions 132 are obtained from the same process. A volume of the first display portions 131 is equal to a volume of the second display portions 132. Because the first display portions 131 and the second display portions 132 are coated simultaneously with the same coating rate and time, therefore the volumes of both are the same.

A difference between a height of a top of each of the second display portions 132 and a height of a top of each of the first display portions 131 is less than a predetermined difference. Namely, the height of the top of each of the second display portions 132 is the same as or similar to the height of the top of each of the first display portions 131.

In an embodiment, spacers 15 are disposed on the first substrate 10, the first substrate 10 can be a color filter substrate, and the second substrate 20 can be a color filter substrate. A liquid crystal layer is also disposed between the first substrate 10 and the second substrate 20. In an embodiment, material of both the first display portions 131 and the second display portions 132 can be color resist material. second substrate 20 can comprise a switch array layer, and a specific structure thereof is not limited. In another embodiment, the first substrate 10 can be an array substrate, the array substrate can comprise a color filter layer.

Because the first recesses are defined in the second limiting portions respectively, surplus material of the display portion is filled in the recess to further decrease the height of the second display portions, which reduces a difference between the heights of the first display portions 131 and the second display portions 132 and enhances flatness of the display substrate.

Figure 5:
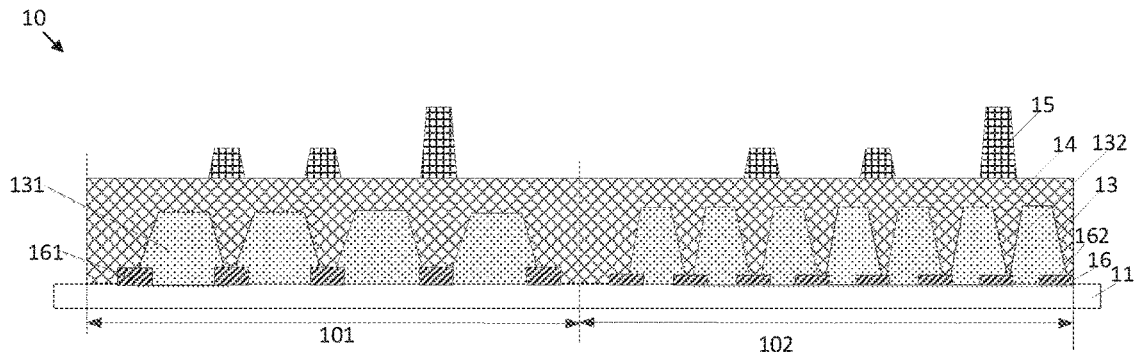
FIG. 5 is a schematic cross-sectional view of the display substrate provided by another embodiment of the present invention.

With reference to FIG. 5, FIG. 5 is a schematic cross-sectional view of the display substrate provided by another embodiment of the present invention.

With reference to FIG. 5, a difference between the display substrate of the present embodiment and that of the former embodiment is that: a thickness of each of the second limiting portions 162 of the display substrate of the present embodiment is less than a thickness of each first limiting portions 161.

Because the thickness of the second limiting portions is reduced, surplus material of the display portion is filled in the portions of the second limiting portions with the reduced thickness to further decrease the height of the second display portions, which reduces a difference between the heights of the first display portions 131 and the second display portions 132 and enhances flatness of the display substrate.

Figure 6:
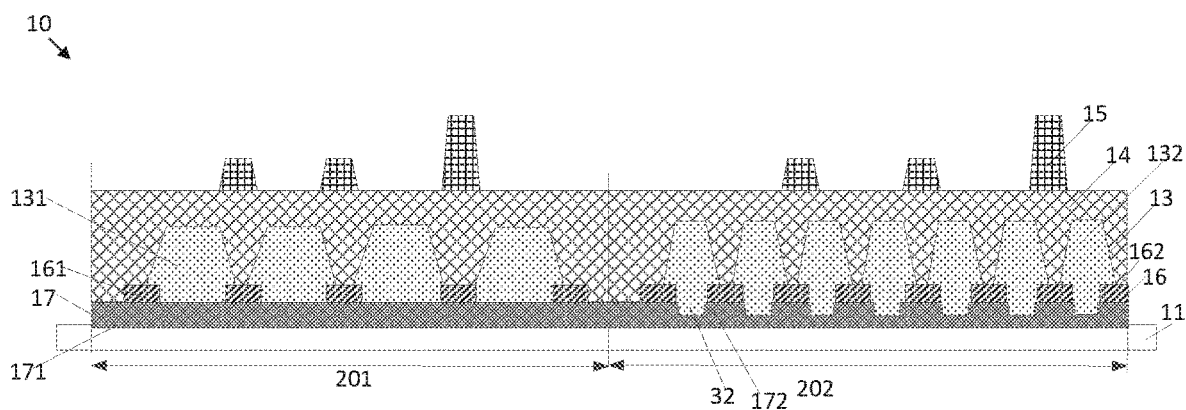
FIG. 6 is a schematic cross-sectional view of the display substrate provided by the present invention another embodiment.

With reference to FIG. 6, FIG. 6 is a schematic cross-sectional view of the display substrate provided by the present invention another embodiment.

Figure 7:
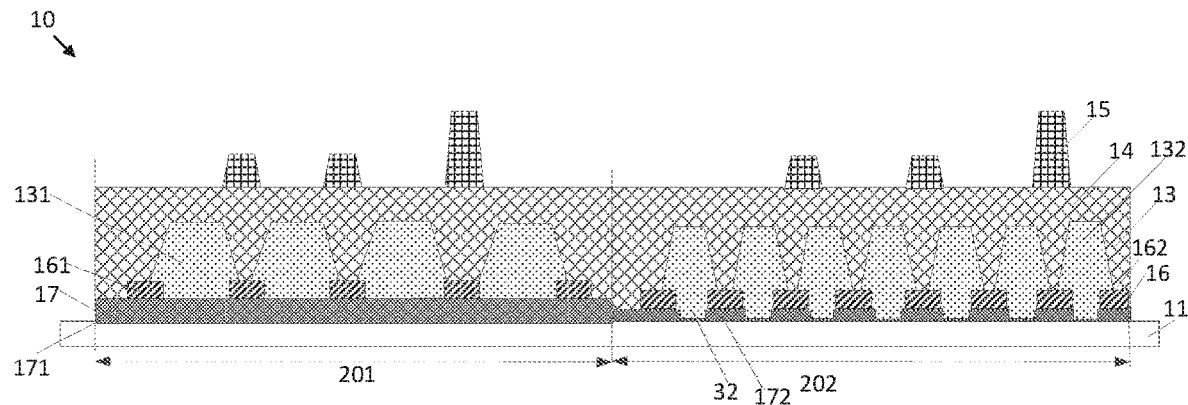
FIG. 7 is a schematic cross-sectional view of the display substrate provided by still another embodiment of the present invention.

With reference to FIG. 6, a difference between the display substrate of the present embodiment and that of the first embodiment is that: the display substrate of the present embodiment further comprises an insulation layer 17, and the insulation layer 17 is disposed between the limiting layer 16 and the underlay substrate 11. The insulation layer 17 comprises a first insulation portion 171 and a second insulation portion 172. The first limiting portions 161 are disposed on the first insulation portion 171. The second limiting portions 162 are disposed on the second insulation portion 172. Second recesses 32 are defined in the second insulation portion 172, each of the second recesses 32 correspond to the gap of the adjacent two second limiting portions 162. A width of each of the second recesses 32 can be greater than the gap of the adjacent two second limiting portions 162. Of course, the width of the second recesses 32 can be less than or equal to the gap of the adjacent two second limiting portions 162. In another embodiment, with reference to FIG. 7, a thickness of the second insulation portion 172 is less than a thickness of the first insulation portion 171. In another embodiment, the thickness of the second insulation portion 172 is less than the thickness of the first insulation portion 171. Furthermore, second recesses 32 are defined in the second insulation portion 172.

Because the second recesses are defined in the second insulation portion or the thickness of the second insulation portion is reduced, surplus material of the display portions is filled in the recesses or in the portion of the second insulation portions with the reduced thickness to further lower the height of the second display portions and decrease the difference of the heights between the first display portions 131 and the second display portions 132, which enhances flatness of the display substrate.

It can be understood that material of the first display portions and the second display portions can be organic light emitting material. Namely, the display substrate of the present embodiment is an organic light emitting diode display substrate, the display substrate of the present embodiment can further comprise film layers such as a cathode and an anode.

It should be understood that FIGS. 2 to 7 only illustrate schematic structural views of an embodiment but cannot limit the present invention.

Figure 8:
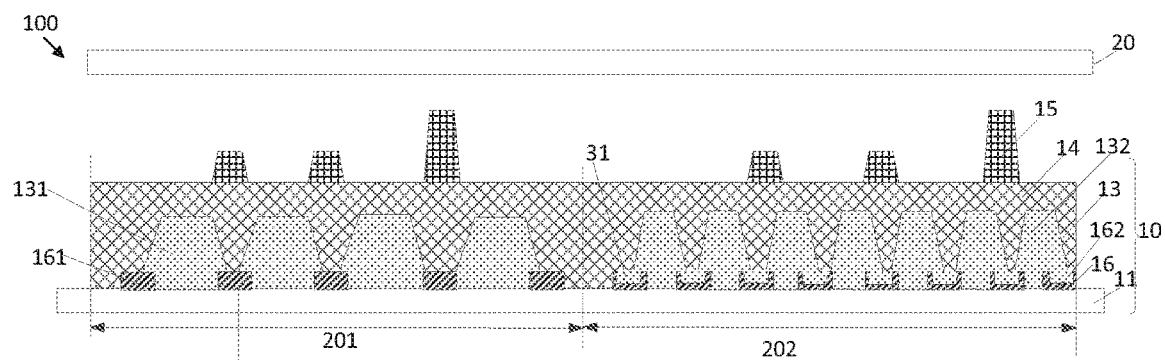
FIG. 8 is a schematic structural view of the display panel provided by an embodiment of the present invention.

With reference to FIG. 8, the present embodiment also provides a display panel 100, comprising any one of the above display substrates 10. In an embodiment, the display panel 100 can further comprise a second substrate 20, and the second substrate 20 is disposed opposite to the array substrate 10. The display panel 100 can be a liquid crystal display panel. A liquid crystal layer (not shown in the figures) is further disposed between the array substrate 10 and the second substrate 20. The liquid crystal layer corresponds to the display portions in position. With reference to FIGS. 3 to 7, the display panel 100 comprises a first sub-display panel 201 and a second sub-display panel 202. An area of each of sub-pixels in the second sub-display panel 202 is less than an area of each of sub-pixels in the first sub-display panel 201. The sub-pixels in the first sub-display panel 201 correspond to the first display portions 131 in position, and the sub-pixels in the second sub-display panel 202 correspond to the second display portions 132 in position. Each of the first sub-display panel 201 and second sub-display panel 202 comprises the above display substrate.

The display panel can be applied to electrical devices with display functions such as cell phones, tablets, computer displays, game consoles, televisions, display screens, wearable apparatuses, and household appliances.

The display substrate and the display panel of the embodiment of the present invention, comprises an underlay substrate; a limiting layer disposed on the underlay substrate, wherein the limiting layer comprises a plurality of first limiting portions disposed at intervals and a plurality of second limiting portions disposed at intervals; a plurality of first display portions, wherein each of the first display portions is disposed in a gap between adjacent two of the first limiting portions and on the adjacent two first limiting portions; and a plurality of second display portions, wherein each of the second display portions is disposed in a gap between adjacent two of the second limiting portions and on the adjacent two second limiting portions, wherein the gap of the adjacent two first limiting portions is greater than the gap of the adjacent two second limiting portions; wherein a difference between a height of a top of the second display portions and a height of a top of the first display portions is less than a predetermined difference. Because the difference between the height of the top of each of the second display portions and the height of the top of each of the first display portions is less than the predetermined difference, flatness of the display substrate and display effect are improved.

The display substrate and the display panel provided by the embodiment of the present invention have been described in detail as above. The principles and implementations of the present application are described in the following by using specific examples. The description of the above embodiments is only for assisting understanding of the technical solutions of the present application and the core ideas thereof. At the same time, for a person skilled in the art, based on the idea of the present invention, there will be changes in the specific implementation and the scope of application. In summary, the content of the specification should not be construed as a limitation on the present invention.

What is claimed is:

1. A display substrate, comprising:
an underlay substrate;
a limiting layer disposed on the underlay substrate, wherein the limiting layer comprises a plurality of first limiting portions disposed at intervals and a plurality of second limiting portions disposed at intervals;
a plurality of first display portions, wherein each of the first display portions is disposed in a gap between adjacent two of the first limiting portions and on the adjacent two first limiting portions; and
a plurality of second display portions, wherein each of the second display portions is disposed in a gap between adjacent two of the second limiting portions and on the adjacent two second limiting portions, wherein the gap of the adjacent two first limiting portions is greater than the gap of the adjacent two second limiting portions;
wherein a difference between a height of a top of the second display portions and a height of a top of the first display portions is less than a predetermined difference;
wherein an insulation layer disposed between the limiting layer and the underlay substrate, wherein the insulation layer comprises a first insulation portion and a second insulation portion, the first limiting portions are disposed on the first insulation portion, and the second limiting portions are disposed on the second insulation portion;
wherein second recesses defined in the second insulation portion, wherein each of the second recesses corresponding to the gap is between adjacent two of the second limiting portions in position.

2. The display substrate as claimed in claim 1, wherein first recesses are defined in the second limiting portions respectively, and a portion of each of the second display portions is disposed in one of the first recesses.

3. The display substrate as claimed in claim 2, wherein a depth of each of the first recesses ranges from 0.05 um to 1 um.

4. The display substrate as claimed in claim 1, wherein a thickness of the second insulation portion is less than a thickness of the first insulation portion.

5. The display substrate as claimed in claim 1, wherein a thickness of each of the second limiting portions is less than a thickness of each of the first limiting portions.

6. The display substrate as claimed in claim 1, wherein a volume of each of the first display portions is equal to a volume of each of the second display portions.

7. The display substrate as claimed in claim 1, wherein material of the limiting layer is light-shielding resin material.

8. A display panel, comprising a first sub-display panel and a second sub-display panel, wherein an area of each of sub-pixels in the first sub-display panel is greater than an area of each of sub-pixels in the second sub-display panel, the sub-pixels of the first sub-display panel correspond to the first display portions in position, the sub-pixels in the second sub-display panel correspond to the second display portions in position, each of the first sub-display panel and the second sub-display panel comprises a display substrate, comprising:
an underlay substrate;
a limiting layer disposed on the underlay substrate, wherein the limiting layer comprises a plurality of first limiting portions disposed at intervals and a plurality of second limiting portions disposed at intervals;
a plurality of first display portions, wherein each of the first display portions is disposed in a gap between adjacent two of the first limiting portions and on the adjacent two first limiting portions; and
a plurality of second display portions, wherein each of the second display portions is disposed in a gap between adjacent two of the second limiting portions and on the adjacent two second limiting portions, wherein the gap of the adjacent two first limiting portions is greater than the gap of the adjacent two second limiting portions;
wherein a difference between a height of a top of the second display portions and a height of a top of the first display portions is less than a predetermined difference;
wherein an insulation layer disposed between the limiting layer and the underlay substrate, wherein the insulation layer comprises a first insulation portion and a second insulation portion, the first limiting portions are disposed on the first insulation portion, and the second limiting portions are disposed on the second insulation portion;
wherein second recesses defined in the second insulation portion, wherein each of the second recesses corresponding to the gap is between adjacent two of the second limiting portions in position.

9. The display panel as claimed in claim 8, wherein first recesses are defined in the second limiting portions respectively, and a portion of each of the second display portions is disposed in one of the first recesses.

10. The display panel as claimed in claim 9, wherein a depth of each of the first recesses ranges from 0.05 um to 1 um.

11. The display panel as claimed in claim 8, wherein a thickness of the second insulation portion is less than a thickness of the first insulation portion.

12. The display panel as claimed in claim 8, wherein a thickness of each of the second limiting portions is less than a thickness of each of the first limiting portions.

13. The display panel as claimed in claim 8, wherein a volume of each of the first display portions is equal to a volume of each of the second display portions.

14. The display panel as claimed in claim 8, wherein material of the limiting layer is light-shielding resin material.

* * * * *